(12) United States Patent
Hsu et al.

(10) Patent No.: US 7,178,755 B2
(45) Date of Patent: Feb. 20, 2007

(54) RETAINER RING FOR WIRE PACKAGE

(75) Inventors: Christopher Hsu, Mentor, OH (US); Elliot K. Stava, Sagamore Hills, OH (US); David J. Barton, Twinsburg, OH (US)

(73) Assignee: Lincoln Global, Inc, City of Industry, CA (US)

( * ) Notice: Subject to any disclaimer, the term of this patent is extended or adjusted under 35 U.S.C. 154(b) by 193 days.

(21) Appl. No.: 10/629,044

(22) Filed: Jul. 30, 2003

(65) Prior Publication Data

US 2005/0023392 A1 Feb. 3, 2005

(51) Int. Cl.
*B65H 59/06* (2006.01)

(52) U.S. Cl. ................. 242/423.1; 242/128; 242/156.1

(58) Field of Classification Search ................. 242/156, 242/156.1, 156.2, 423.1, 566, 593, 128, 129; 206/408, 409, 397, 389, 413, 414, 817
See application file for complete search history.

(56) References Cited

U.S. PATENT DOCUMENTS

| | | | |
|---|---|---|---|
| 2,864,565 A * | 12/1958 | Whearley | ................. 242/128 |
| 3,051,988 A | 9/1962 | Baemann | |
| 3,053,410 A * | 9/1962 | Eaddy | |
| 4,320,833 A * | 3/1982 | Antoniotti et al. | |
| 4,395,043 A * | 7/1983 | Gargione | |
| 4,869,367 A | 9/1989 | Kawasaki | |
| 5,277,314 A | 1/1994 | Cooper | |
| 5,819,934 A | 10/1998 | Cooper | |
| 5,827,170 A * | 10/1998 | Gebran | |
| 5,845,862 A * | 12/1998 | Cipriani | ................. 242/423.1 |
| 5,942,961 A * | 8/1999 | Srail et al. | |
| 6,406,419 B1 * | 6/2002 | Farahmand | |
| 6,547,176 B1 * | 4/2003 | Blain et al. | ............. 242/423.1 |
| 6,580,348 B1 * | 6/2003 | Hundt et al. | |
| 6,745,899 B1 * | 6/2004 | Barton | ....................... 206/409 |

FOREIGN PATENT DOCUMENTS

| | | | |
|---|---|---|---|
| FR | 2 278 617 | | 2/1976 |
| JP | 3-116999 | | 5/1991 |
| JP | 3 264169 A | | 11/1991 |
| JP | 4 112169 | | 4/1992 |
| JP | 04-112169 | * | 4/1992 |
| JP | 4 133973 | | 5/1992 |
| JP | 04-133973 | * | 5/1992 |
| JP | 6-27268 | | 7/1994 |
| JP | 9 323120 | | 12/1997 |
| JP | 2001 302096 | | 10/2001 |
| SU | 584 925 | | 12/1977 |

OTHER PUBLICATIONS

Specification Sheet—Flexmag Ind., Inc.—Mariette, Ohio, Jun. 2002.

* cited by examiner

*Primary Examiner*—William A. Rivera
(74) *Attorney, Agent, or Firm*—Fay Sharpe LLP

(57) ABSTRACT

A welding wire package comprising a cylindrical drum with a central axis, multiple layers of looped welding wire defining a wire stack to be paid out, said body having an upper ring shaped surface with an outer cylindrical surface generally covering or overhanging the wire stack and an inner cylindrical surface defining a central bore concentric with the drum axis and a flexible permanent magnet retainer ring on top of the upper ring shaped surface wherein the retainer ring allows welding wire to be paid from under the ring upwardly from the central bore.

42 Claims, 4 Drawing Sheets

RETAINER RING FOR WIRE PACKAGE

The present invention relates to a weld wire package and more particularly to an improved retainer ring for a loosely wound package, such as a fiber drum or cardboard box container or pail housing.

INCORPORATION BY REFERENCE

Welding wire used in high production operations, such as robotic welding stations, is provided in a package having over 200 pounds of wire. The package is often a drum where a large volume of welding wire is looped in the drum around a central core or a central clearance bore. During transportation and use the volume of loop wire in the drum is decreased. To control the transportation and payout of the wire, it is standard practice to provide an upper, weighted retainer ring. An early ring is shown in Kawasaki U.S. Pat. No. 4,869,367 wherein the ring slides by its own weight along the inner surface of the drum by outwardly extending resilient members. These members center the ring over the top of the loop wire so the wire can be pulled to the center and paid out during welding. This patent is incorporated by reference herein as background technology which need not be repeated in this disclosure.

A similar retainer ring is shown as prior art in Cooper U.S. Pat. No. 5,277,314 directed to an improved upper retaining ring which has an inner contoured surface to facilitate wire payout without tangles. This patent is incorporated by reference herein. A retainer ring more close to the type of ring of the present invention is disclosed in Cooper U.S. Pat. No. 5,819,934 wherein the ring is described as having a function during transportation to move downwardly as the welding wire settles in the drum. This patent is also incorporated by reference herein.

The present invention relates to use of a particular material for the flat retainer ring. This material was introduced by Max Baermann in the late 1950's and is disclosed generally in Baermann U.S. Pat. No. 3,051,988. The Baermann material is barium ferrite in a non-magnetic, flexible binder and is commonly used for flexible magnet sheets of the type used for removable displays. Such material is now manufactured by many companies. The present invention utilizes a thin, flexible permanent magnet sheet manufactured by Flexmag, Inc. of Marietta, Ohio. A specification sheet for this commercially available material is also incorporated by reference herein with the Baermann patent. The present invention does not relate to any novelty in the flexible magnet sheet, which sheet is a standard commercial product having characteristics which need not be repeated in this disclosure.

BACKGROUND OF INVENTION

In the welding industry, tremendous numbers of robotic welding stations are operable to draw welding wire from a package as a continuous supply of wire to perform successive welding operations. The advent of this mass use of electric welding wire has caused tremendous research and development in improving the packaging for the bulk welding wire. A common package is a drum where looped welding wire is deposited in the drum as a wire stack, or body, of wire having a top surface with an outer cylindrical surface against the drum and an inner cylindrical surface defining a central bore. The central bore is often occupied by a cardboard cylindrical core as shown in Cooper U.S. Pat. No. 5,819,934. It is common practice for the drum to have an upper retainer ring that is used in transportation to stabilize the body of welding wire as it settles. This ring is shown in Cooper U.S. Pat. No. 5,819,934 remains on the top of the welding wire to push downward by its weight so the wire can be pulled from the body of wire between the core and the ring. Each loop of wire has one turn of built-in twist so that when it is paid out, the twist introduced by releasing a loop of wire is canceled. Hence the wire is "twist-free" when it reaches the contact tip. The built-in twist causes the wire to spring up from the top of the stack when unrestrained. The weighted ring prevents wire from springing up due to the built-in twist. The weight of the ring is critical. Heavier rings tend to bend or recast the wire, causing wire to wobble when it exits the contact tip, although it is more effective to prevent tangle. Lighter rings can be easily lifted by the wire during payout, thus losing its contact to the top of the wire stack; and thereby losing its intended purpose of restraining wire movement at the top of the wire stack. Lighter rings have more propensity of tangle, although producing less wire wobble. This is the pitfall of the weighted ring design, essentially facing the difficulty of striking a balance of less tangle and less wire wobble. Tangles are detrimental to the operation of the package since they cause down time of the robotic welding station. Tangles are caused by many adverse movements of the wire loops on top of the wire stack. The wire has a winding cast that can snap around the outside of the retainer ring or the wire can bunch and slip at the inside of the retainer ring. The most common tangle is caused as wire is pulled from the inside of the ring and is referred to as "e script" because of its shape. An e script tangle stops operation of the welder and must be removed. Retainer rings so far on the market are not effective in preventing e script tangles. This type of tangle is caused by poor alignment of drive rolls of the wire feeder that builds up back-twist in the wire as it feeds the wire. The twist ultimately makes it way back to the drum and leads to an e script tangle. The objective of a retainer ring design is to increase operating welding time between successive e-tangles. The weighted retainer rings have not been successful in eliminating such tangles. The present invention is related to a retainer ring which essentially eliminates e script tangles in the welding wire being pulled from the center of the looped wire body of a drum package.

STATEMENT OF INVENTION

In accordance with the present invention, the standard weighted retainer ring, as shown in Cooper U.S. Pat. No. 5,819,934, is formed from a thin flat, flexible permanent magnet sheet. Thus, the welding wire new package includes a cylindrical drum with a central axis and containing multiple layers of looped welding wire defining the wire stack to be paid out, which body has an upper ring shaped surface with an outer cylindrical surface generally matching the drum and an inner cylindrical surface defining a central bore concentric with the drum axis. The wire body is overlaid with a flexible permanent magnet ring on the top of the upper ring shaped surface. This magnet retainer ring allows welding wire to be paid out from under the ring and upwardly from the central bore of the welding wire body loaded into the drum. The flexible magnet sheet is a standard commercial product; however, its use as a retainer ring for a welding wire package involves cutting the commercial sheet into a ring shape having an outer periphery covering or overhanging the wire stack and an inner periphery which is generally circular and matches the inner surface of the stored welding wire stack. In a test for creation of e script tangles, where the drum is rotated to create tangles and the length of wire between tangles is measured, it has been found that a standard weighted retainer ring, such as shown in Cooper U.S. Pat. No. 5,819,934, allowed such tangles at a rate of at least 25–30 times as frequent as a retainer ring constructed in accordance with the present invention. Indeed, by rotating the drum or wire and paying out the wire in an effort to cause such tangles, an e tangle often was not created during the duration of a standard test run when using the present invention. The reason for this improved performance appears to be that the flexible magnet sheet is held magnetically against the top of the magnetic wire and is pulled upwardly only in the area where the wire exits from the looped welding wire body. The external twist caused by feeder does not disturb the order of wire loops under the ring easily because the loops are held in place by magnetic force. The wire loops are less likely to pop out prematurely or become "out-of-order"—the order by which it was wound. Consequently, control of the wire movement under the ring is maintained during the payout operation. Furthermore, when using a standard retainer ring, the ring is shifted over the top of the wire in an orbit motion determined by the circumferential location from which the wire is being pulled. The present invention does not allow movement of the ring over the top of the welding wire to thereby open space between the ring and the drum to cause tanglements. These distinctive characteristics of the present invention drastically reduce the amount of tangles of the payout wire and thus is a substantial improvement over existing, standard weighted retainer rings.

The primary object of the present invention is the provision of a retainer ring for a welding wire package which retainer ring is formed from a sheet of flexible permanent magnet material that is held on the top of the wire by the magnetic force created by the sheet and not by its weight.

Still a further object of the present invention is the provision of a retainer ring, as defined above, which retainer ring requires no modification of the drum used in the welding wire package.

Another object is to provide robust and intimate contact to the top of the wire stack from its flexible and magnetic nature, thus avoiding pitfalls of the rigid steel or plastic ring which can be lifted at one side by the force of the wire loses partial contact with the wire stack and decrease its effectiveness of restraining wire movement.

Still a further object of the present invention is the provision of a retainer ring, as defined above, which retainer ring is fairly inexpensive, easy to manufacture and does not add weight or complexity to the welding wire package.

These and other objects and advantages will become apparent from the following description taken together with the accompanying drawings.

PREFERRED EMBODIMENT

Figure 1:
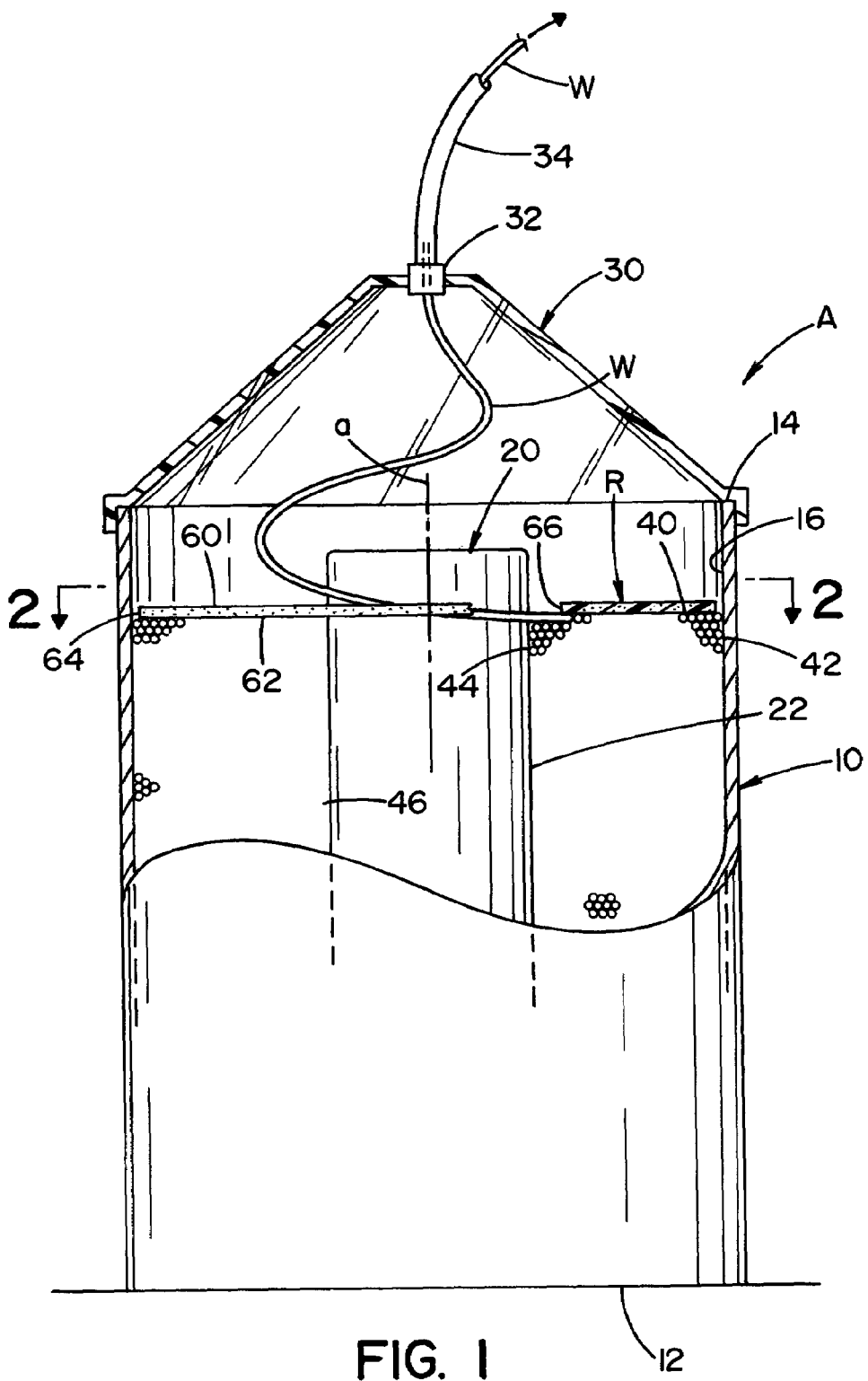
FIG. 1 is a side elevational view of a welding wire package showing in partial cross-section the preferred embodiment of the present invention.
Figure 2:
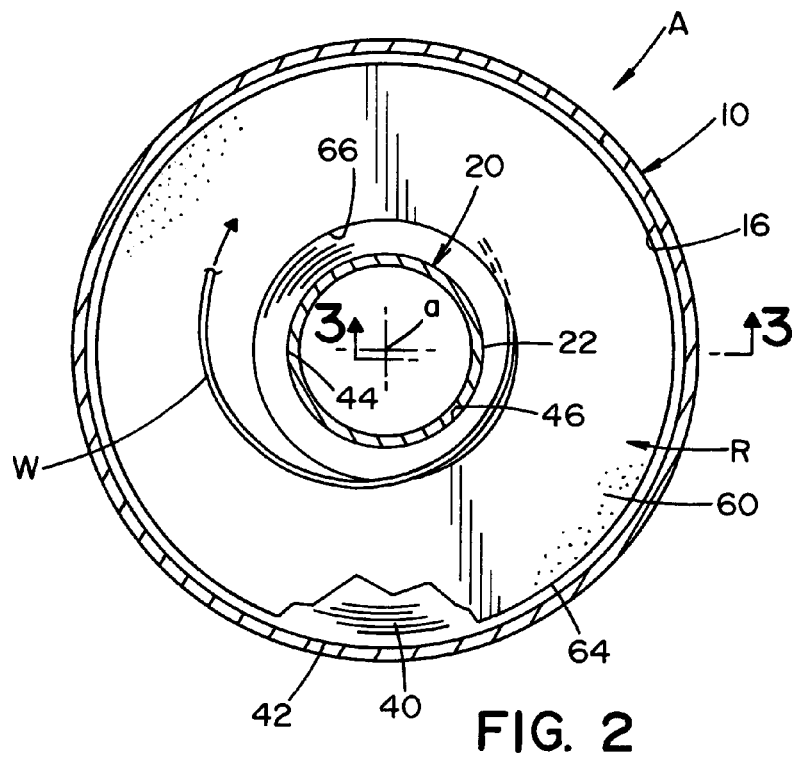
FIG. 2 is a cross sectional view taken generally along line 2—2 of FIG. 1.
Figure 3:
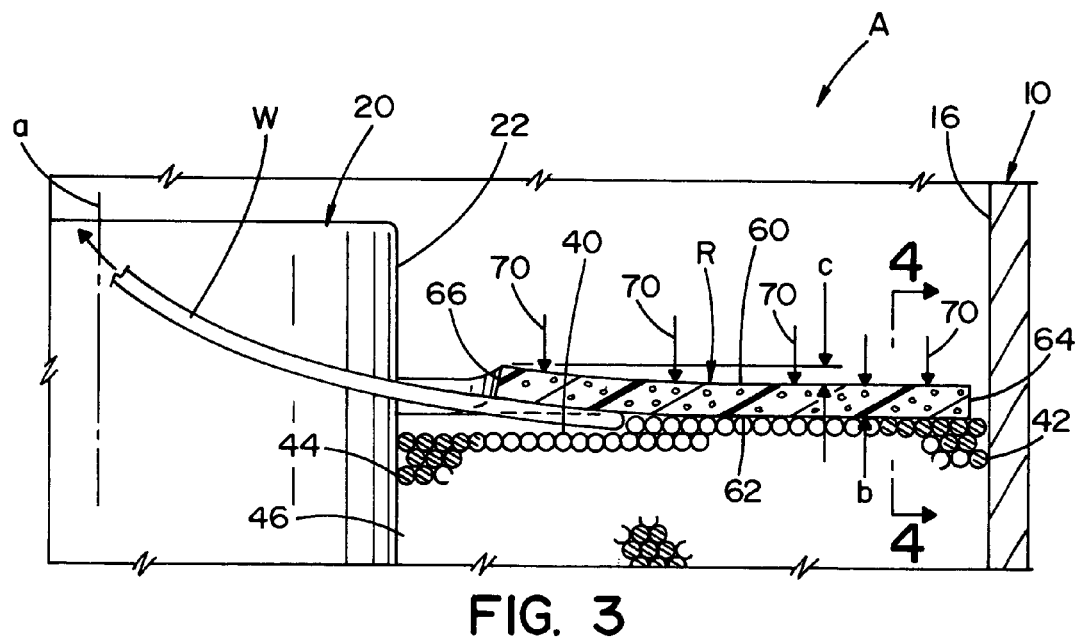
FIG. 3 is an enlarged partial view showing in cross-section operating characteristics of th present invention.
Figure 4:
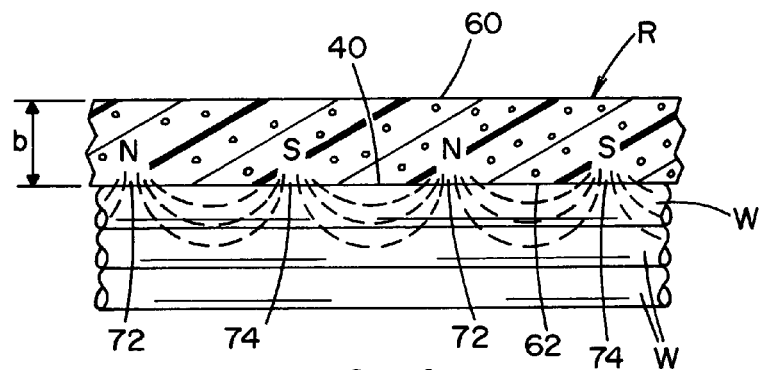
FIG. 4 is an enlarged cross-sectional view taken generally along line 4—4 of FIG. 3.

A standard welding wire drum type package is shown in FIGS. 1 and 2 wherein wire W is stored in and paid out of cylindrical drum 10 having a bottom 12, a top 14 and an inside diameter 16. In accordance with this type of drum it is common practice to use a cylindrical cardboard core 20 having an outer diameter 22. Inside surface 16 and outside surface 22 are cylindrical and concentric with central axis a of drum 10. At the welding facility, the top or lid of drum 10 (not shown) is removed and replaced with a feeding hat 30 including an upper grommet 32 communicated with a standard feed tube 34. Wire W is pulled from drum 10 during the welding operation. Package A is loaded at the wire manufacturing facility by being looped around core 20 to define a body of welding wire having a top surface 40, an outer cylindrical surface 42 against surface 16 and an inner cylindrical surface 44 against or close to surface 22. In this manner, a central vertically extending bore 46 is concentric with axis a and around core 20. In some instances, the core is not used, but center bore 46 is provided in the wire looping operation. The wire is looped in a manner that has a cast to facilitate payout with a minimum of tangles. A retainer ring is used in drum 10 to prevent tangles as wire W is pulled from the body of wire. The present invention is a retainer ring R cut from a flexible permanent magnet sheet having a top surface 60 and a bottom surface 62. The sheet is cut into a shape defining an outer periphery 64 and an inner periphery 66. As shown in FIGS. 1 and 2 ring R is spaced slightly inward of surface 16 and is not quite as small as the circumference of surface 22. Essentially, the ring R will fit within drum 10 and allow a gap between periphery 66 and surface 22 so wire W can be drawn from the top of the wire body and from under the retainer ring. This payout action is illustrated in FIG. 3. In practice, the sheet from which ring R is formed is purchased from Flexmag Inc. in Marietta, Ohio. As shown in FIG. 4, the thickness b of retainer ring is preferably 1/16 of an inch. The thickness can be adjusted generally between about 0.01–0.10 inches. The preferred sheet is made from ferrite particles in a non-magnetic binder. The ferrite is normally barium ferrite and the binder is polyethylene. The magnetic strength of the flexible sheet is preferably 0.6 Megagauss Oersteds. However, it has been found that a magnetic sheet having less than about 1.0 Megagauss Qersteds are used. Of course, other magnetic particles are used instead of the low cost ferrite, which is normally used in the commercial flexible permanent magnet sheets. The sheets can be easily machined by a punch press without losing any magnetic energy. As shown in FIG. 3, the advantage of the present invention is that ring R is moved upwardly at the circumferential location where the wire is being pulled from the drum. This is illustrated as a flexed or lifted distance c. At the same time, the downward force on the top surface 40 is maintained constant as indicated by arrows 70. Thus, the weight of the ring is not controlling payout of wire W. The magnetic force of the ring holds the ring down, except where it is being pulled upwardly allowing removal of wire W. As shown in FIG. 4, bottom surface 62 includes a plurality of opposite polarity magnetic poles 72, 74 spaced in various patterns. Indeed, the top surface could have the same magnetic poles so the orientation of ring R is not important. As wire W is pulled from the drum, ring R remains fixed in its position on the top of the wire due to the tremendous amount of magnetic forces in areas, other than where ring R is being flexed upwardly to allow withdrawal of the wire. Consequently, ring R stays centered in the proper position during the payout operation and controls movement of the wire. It is understood that a rigid flexible permanent magnet ring would also stay generally centered and would be an improvement over the existing rigid steel weighted ring. The improvement would be use of magnetic force instead of the weight of the ring to maintain the position of the ring on the top of the wire. Furthermore, a magnet metal ring would remain generally in the right position during payout. Ring R does not shift vertically as a rigid unit on the top of the wire as the prior art shown generally in FIGS. 5 and 6.

Figure 5:
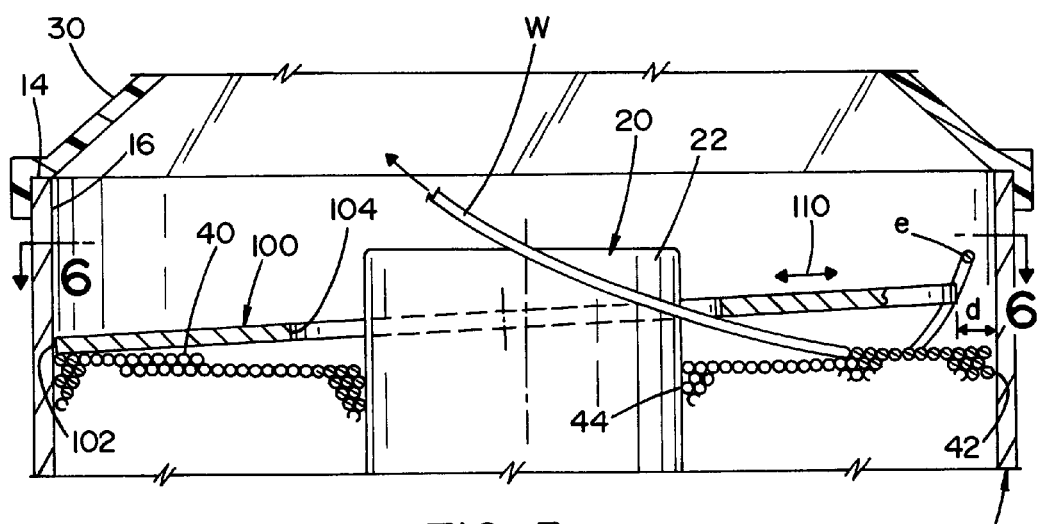
FIG. 5 is a partial top cross-sectional view showing operating characteristics of the prior art; and, FIG. 6 is a reduced cross-sectional view similar to FIG. 2 and taken generally along line 6—6 of FIG. 5.
Figure 6:
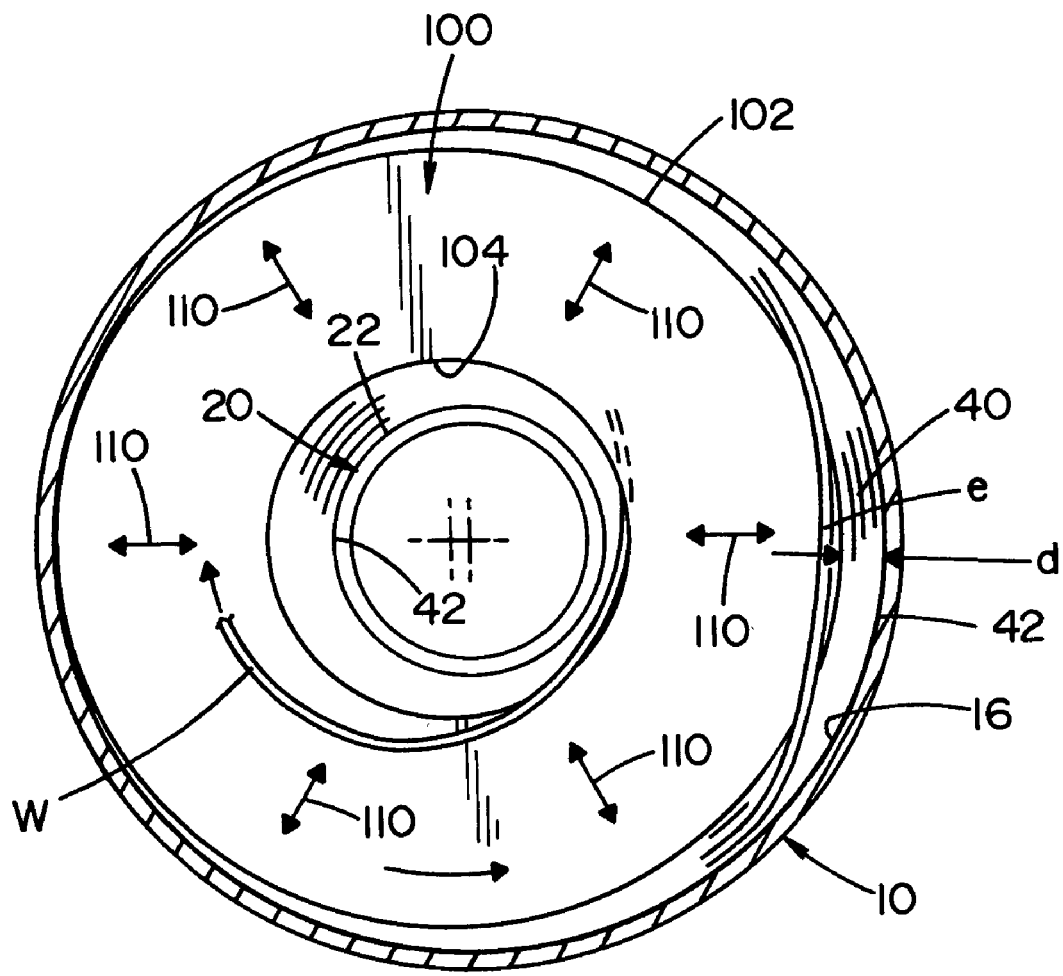

Referring now to the prior art shown in FIGS. 5 and 6, rigid metal ring 100 has a weight to hold it down against top surface 40 of the looped wire. Ring 100 has an outer periphery 102 and an inner periphery 104. As the wire is pulled from the drum as shown in FIG. 5, there is a tendency to tilt rigid metal ring 10.0 and pull the ring away from surface 16 to create an enlarged gap d that is conductive to a pop up e script tangle. As the wire is pulled from the drum, ring 100 orbits back and forth as indicated by arrows 110 to create the gap d and also inconsistencies during the payout operation. This difficulty experienced in prior retainer rings is overcome by the present invention wherein a magnet ring is used. Preferably, the magnet ring is flexible to allow deformation as shown in FIG. 3, so it will adapt to uneven wire stack top surfaces.

The present invention employs a magnetic field to restrain the welding wire of the stack. The field is preferably created by a ring formed from a thin permanent magnet, flexible sheet. In the alternative the retainer ring is a thin magnetized steel ring. An electromagnetic field can be generated by an electromagnet mounted in hat 30. This field is directed by high permeability members to the top of the wire stack to control payout of the wire. This is a one time installation for use with successive wire packages.

The invention claimed is:

1. A welding wire package comprising a drum or box with a central axis, multiple layers of looped welding wire defining a stack of wire to be paid out, said stack having an upper ring shaped surface with an outer cylindrical surface and an inner cylindrical surface defining a central bore concentric with said central axis and a flexible permanent magnet retainer ring on top of said upper ring shaped surface, said retainer ring having an inner periphery edge defining a wire removing opening and allowing welding wire to be paid out from under said retainer ring upwardly through said opening such that the welding wire engages said inner edge at a circumferential location, said flexible magnetic ring being resilient such that the welding wire flexes upwardly said retainer ring including said inner edge at said circumferential location as the welding wire is paid out.

2. A welding wire package as defined in claim 1 wherein said flexible magnet ring has a thickness in the general range of 0.10–0.01 inches.

3. A welding wire package as defined in claim 2 wherein said flexible magnet ring has a magnetic strength of less than 1.0 Megagauss Oersteds.

4. A welding wire package as defined in claim 3 wherein said flexible magnet ring is a generally annular ring body formed by a substantially uniform magnetic composition that extends between said inner periphery edge and an outer peripheral edge that is opposite to inner periphery edge.

5. A welding wire package as defined in claim 4 wherein said ring body extends between a bottom surface that engages said upper ring shaped surface of said wire stack and an upper surface opposite to said bottom surface, said bottom and top surfaces extending between said inner and outer edges, said substantially uniform magnetic composition extending between said bottom and top surfaces.

6. A welding wire package as defined in claim 4 wherein said uniform magnetic composition includes ferrite particles in a flexible non-magnetic binder.

7. A welding wire package as defined in claim 2 wherein said flexible magnet ring is a generally annular ring body formed by a substantially uniform magnetic composition that extends between said inner periphery edge and an outer peripheral edge that is opposite to inner periphery edge.

8. A welding wire package as defined in claim 7 wherein said ring body extends between a bottom surface that engages said upper ring shaped surface of said wire stack and an upper surface opposite to said bottom surface, said bottom and top surfaces extending between said inner and outer edges, said substantially uniform magnetic composition extending between said bottom and top surfaces.

9. A welding wire package as defined in claim 7 wherein said uniform magnetic composition includes ferrite particles in a flexible non-magnetic binder.

10. A welding wire package as defined in claim 2 wherein said package further includes a side wall supporting the outer cylindrical surface of the wire stack, said flexible magnet ring having an outer periphery generally matching said side wall.

11. A welding wire package as defined in claim 10 wherein said outer periphery is generally circular.

12. A welding wire package as defined in claim 1 wherein said flexible magnet ring has a magnetic strength of less than 1.0 Megagauss Oersteds.

13. A welding wire package as defined in claim 12 wherein said flexible magnet ring is a generally annular ring body formed by a substantially uniform magnetic composition that extends between said inner periphery edge and an outer peripheral edge that is opposite to inner periphery edge.

14. A welding wire package as defined in claim 13 wherein said ring body extends between a bottom surface that engages said upper ring shaped surface of said wire stack and an upper surface opposite to said bottom surface, said bottom and top surfaces extending between said inner and outer edges, said substantially uniform magnetic composition extending between said bottom and top surfaces.

15. A welding wire package as defined in claim 14 wherein said package further includes a side wall supporting the outer cylindrical surface of the wire stack, said outer periphery of said ring body generally matching said side wall.

16. A welding wire package as defined in claim 15 wherein said outer periphery is generally circular.

17. A welding wire package as defined in claim 13 wherein said uniform magnetic composition includes ferrite particles in a flexible non-magnetic binder.

18. A welding wire package as defined in claim 12 wherein said package further includes a side wall supporting the outer cylindrical surface of the wire stack, said flexible magnet ring having an outer periphery generally matching said side wall.

19. A welding wire package as defined in claim 18 wherein said outer periphery is generally circular.

20. A welding wire package as defined in claim 1 wherein said flexible magnet ring is a generally annular ring body formed by a substantially uniform magnetic composition that extends between said inner periphery edge and an outer peripheral edge that is opposite to inner periphery edge.

21. A welding wire package as defined in claim 20 wherein said ring body extends between a bottom surface that engages said upper ring shaped surface of said wire stack and an upper surface opposite to said bottom surface, said bottom and top surfaces extending between said inner and outer edges, substantially uniform magnetic composition extending between said bottom and top surfaces.

22. A welding wire package as defined in claim 20 wherein said package further includes a side wall supporting the outer cylindrical surface of the wire stack, said outer periphery of said ring body generally matching said side wall.

23. A welding wire package as defined in claim 22 wherein said outer periphery is generally circular.

24. A welding wire package as defined in claim 20 wherein said uniform magnetic composition includes ferrite particles in a flexible non-magnetic binder.

25. A welding wire package as defined in claim 1 wherein said package further includes a side wall supporting the outer cylindrical surface of the wire stack, said flexible magnet ring having an outer periphery generally matching said side wall.

26. A welding wire package as defined in claim 25 wherein said outer periphery is generally circular.

27. A retainer ring for use in a package looped welding wire, said ring being a flat sheet of flexible permanent magnet material with an outer periphery edge and an inner periphery edge, said outer edge having a diameter large enough to substantially cover the looped welding wire, said retainer ring being resilient such that the welding wire engaging said inner edge during the unwinding of the wire from the package flexes said inner edge of said ring upwardly.

28. A retainer ring as defined in claim 27 wherein said ring has a thickness in the general range of 0.10–0.01 inches.

29. A retainer ring as defined in claim 27 wherein said ring has a magnetic strength of less than 1.0 Megagauss Oersteds.

30. A retainer ring as defined in claim 27 wherein said ring includes ferrite particles in a flexible non-magnetic binder.

31. A retainer ring for use in a package of looped welding wire, said ring being a flat sheet of flexible permanent magnet material having a substantially uniform magnetic composition extending between an outer periphery edge and an inner periphery edge said outer periphery having a diameter large enough to substantially cover the looped welding wire, said inner edge defining an inner opening having a diameter sized to allow the welding wire to pass through said opening during the unwinding of the wire from said package and said ring controlling the unwinding of the welding wire based substantially on the magnetic properties of said ring said retainer ring being resilient such that the welding wire engaging said inner edge during the unwinding of the wire from the package flexes said inner edge of said ring upwardly.

32. A retainer ring as defined in claim 31 wherein said ring has a thickness in the general range of 0.10–0.01 inches.

33. A retainer ring as defined in claim 31 wherein said ring has a magnetic strength of less than 1.0 Megagauss Oersteds.

34. A retainer ring as defined in claim 31 wherein said ring is flexible and includes ferrite particles in a flexible non-magnetic binder.

35. A method of controlling the payout of a welding wire in a package at a welding operation, said package comprising a stack of multiple layers of looped welding wire having an annular top and an oppositely facing bottom, said method including:
(a) applying a flexible magnetic retainer ring on the top of the wire stack such that said ring applies a magnetic field to the top of said stack, said ring being formed by ferrite particles in a flexible non-magnetic binder such that said ring is deformable by the welding wire; and,
(b) pulling said wire from said stack for feeding to said welding operation such that said welding wire flexes a portion of said ring upwardly as the welding wire is paid out while a remaining portion of said ring remains adjacent to said top of said stack.

36. A method as defined in claim 35 wherein said retainer ring has in inner peripheral edge and an outer peripheral edge wherein said ferrite particles and said non-magnetic binder extend between said inner and outer edges.

37. A method as defined in claim 35 wherein said applying act is accomplished by an electromagnet.

38. A welding wire package comprising a drum or box with a central axis, multiple layers of looped welding wire defining a stack wire to be paid out, said stack having an upper ring shaped surface with an outer cylindrical surface and an inner cylindrical surface defining a central bore concentric with said central axis and a retainer ring having a bendable retainer ring body on top of said upper ring shaped surface that can conform to the upper ring shaped surface, said retainer ring allowing welding wire to be paid from under the ring upwardly from said stack and being deflectable such that the welding wire flexes a portion of said retainer ring as the welding wire is paid out from said stack while the remaining portion of said ring remains adjacent to said upper ring shaped surface.

39. A welding wire package as defined in claim 38 wherein said flexible ring body has a thickness in the general range of 0.10–0.01 inches and is a polymer.

40. A welding wire package as defined in claim 38 wherein said flexible ring body has a thickness in the general range of 0.10–0.01 inches and includes a rubber binder.

41. A welding wire package comprising a drum or box with a central axis, multiple layers of looped welding wire defining a stack wire to be paid out, said stack having an upper ring shaped surface with an outer cylindrical surface and an inner cylindrical surface defining a central bore concentric with said central axis and a resilient retainer ring on top of said upper ring shaped surface, said retainer ring being configured to allowing the welding wire to be paid from under the ring upwardly from said stack such that said ring confirms to changing contour of said upper ring shaped surface and deflects upwardly only where said ring is engaged by the exiting wire as said wire is paid out, said resilient ring being a permanent magnet sheet.

42. A welding wire package comprising a drum or box with a central axis, multiple layers of looped welding wire defining a stack wire to be paid out, said stack having an upper ring shaped surface with an outer cylindrical surface and an inner cylindrical surface defining a central bore concentric with said central axis and a deformable magnetic retainer ring on top of said upper ring shaped surface, said retainer ring having an inner peripheral edge defining an inner opening and an outer peripheral edge opposite to said inner peripheral edge, said retainer ring allowing welding wire to be paid from under the ring upwardly from said stack and through said inner opening, said deformable ring has a thickness in the general range of 0.10–0.01 inches and is rubber, and said ring being deformable by said welding wire as said welding wire is paid out of said package, said retainer ring being a permanent magnet sheet comprised of ferrite particles in a non-magnetic binder.

\* \* \* \* \*